United States Patent Office 3,454,583
Patented July 8, 1969

3,454,583
SYNTHESIS OF VINCAMINE
Martin E. Kuehne, Burlington, Vt., assignor to the United States of America as represented by the Secretary of the Department of Health, Education, and Welfare
No Drawing. Filed July 19, 1965, Ser. No. 475,911
Int. Cl. C07d 57/02, 29/22
U.S. Cl. 260—294.3                                      1 Claim

ABSTRACT OF THE DISCLOSURE

Vincamine is totally synthesized from tryptamine and 4-ethyl-4-formyldimethyl pimelate, reaction of the resulting lactam ester with phosphorus pentasulfide, desulfurization of the resulting thiolactam ester, oxidation of the resulting aminoester and acid treatment of the oxidized product to yield dl-vincamine. Novel intermediates and epimers are disclosed.

---

This invention relates to a process for the preparation of vincamine and to the intermediates produced in the process.

Vincamine, the major alkaloid occurring in *Vinca minor* L, (Apocyanaceae), possesses valuable antihypertensive and sedative properties as reported by L. Szporny and K. Szasz, Arch. Exptl. Pathol. Pharmak., 236, 296 (1959).

An object of this invention is a new process for the preparation of pure vincamine by a total synthesis which does not require the use of costly natural products as starting compounds.

Another object of the invention is the preparation of vincamine from tryptamine by the scheme and process set forth herein.

A further object of the invention is the obtention of the intermediates involved in the synthesis of vincamine as set forth herein.

The steps involved in the synthesis of vincamine (I) and the various intermediates are set forth in the following scheme:

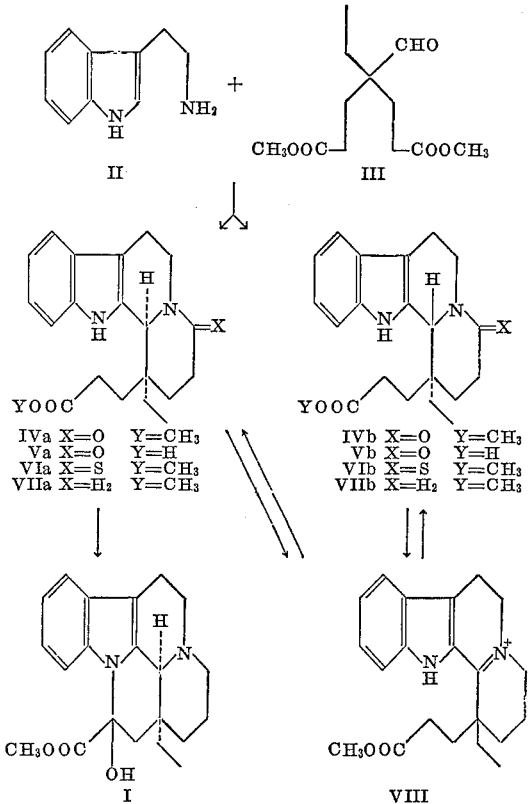

The synthesis first involves the condensation of tryptamine (II) with 4-ethyl-4-formyldimethyl pimelate (III), yielding a mixture of intermediate lactam ester IVa, its epimer IVb and intermediate lactam acids Va and Vb. The pimelic acid ester (III) is readily obtainable by exhaustive alkylation of the pyrrodiline enamine of butyraldehyde w methyl methacrylate, followed by hydrolysis, as reported in J. Org. Chem., 29, 1582 (1964). Hydrolysis of the lactam esters IVa and IVb with aqueous sodium bicarbonate yields the lactam acids Va and Vb, which are convertible back to the methyl esters IVa and IVb by reaction with diazomethane.

Reaction of the esters IVa and IVb with phosphorus pentasulfide yields thiolactam esters VIa and VIb. Desulfurization of the thiolactam esters VIa and VIb with Raney nickel yields amino esters VIIa and VIIb, which can be separated by column chromatography on neutral alumina.

Oxidation of the more rapidly eluted ester VIIa with p-nitrosodimethylaniline and sodium triphenylmethyl, followed by acid treatment yields dl-vincamine I and epivincamine, the hydroxyepimer thereof. Analogous oxidation of amino ester VIIb yields isovincamine, having D–E ring junction trans and epiisovincamine with D–E ring junction trans and the hydroxyl group in epimeric orientation.

Oxidation of the animoesters VIIa and VIIb with mercuric acetate yields the didehydroimmonium salt VIII which can be reduced with sodium borohydride to yield a mixture of the aminoesters VIIa and VIIb.

EXAMPLE

The detailed process steps are set forth as follows:

A. Dimethyl-(4-ethyl-4-formyl)-pimelate 1-pyrrolidinobutene.—A mixture of 71 g. (1 mole) of pyrrolidine and 71 g. of anhydrous potassium carbonate was stirred under an atmosphere of nitrogen. With cooling ein an ice bath, 36 g. (0.50 mole) of freshly distilled n-butyraldehyde was added dropwise. After 1,5 hours at room temperature the liquid was separated from the solid by centrifugation and then distilled at 70 mm. At a bath temperature of 115°, pyrrolidine (0.5 mole) was removed by pyrolysis and the product then collected at 88–95°, giving 31 g. of (0.25 mole) of product.

Dimethyl-(4-ethyl-4-formyl)-pimelates.—At 0–5°, 22 g. (0.18 mole) of 1-pyrrolidinobutene was added dropwise to a stirred solution of 38 g. (0.44 mole) of methylacrylate in 150 ml. of methanol, with stirring under a nitrogen atmosphere. After 14 hours at 25° and 36 hours at reflux, 11 ml. of acetic acid in 60 ml. of water was added and refluxing continued for eight hours. The reaction mixture was then concentrated under vacuum, diluted with 300 ml. of water and extracted five times with 100 ml. of dichloromethane. The extracts were washed with sodium carbonate solution, dried over magnesium sulfate and concentrated under vacuum. The residual oil was distilled and 20.0 g. (0.082 mole) of the product collected at 106–107° (0.07 mm.).

*Analysis.*—Calcd. for $C_{12}H_{20}O_5$: C, 59.00; H, 8.25. Found: C, 58.88; H, 8.20.

B. 1,2,3,4,6,7,12, e-octahydro-1-ethyl - 1 - carbomethoxyethyl-4-oxo-indolo-[2,3-a]-quinolizine A solution of 2.4 g. (0.015 mole) of tryptamine and 3.7 g. (0.015 mole) of dimethyl-4-ethyl-4-formylpimelate in 25 ml. of dry acetic acid was refluxed for 20 hours. The solvent was removed under vacuum, 100 ml. of water containing 2.0 g. of sodium hydroxide added and the mixture extracted five times with 100 ml. of dichloromethane. Concentration and crystallization from ethyl acetate gave 3.8 g. (0.011 mole) of a mixture of crystalline epimers, M.P. 160–182°.

*Analysis.*—Calcd. for $C_{21}H_{26}N_2O_3$: C, 71.17; H, 7.39; N, 7.90. Found: C, 70.89; H, 7.46; N, 7.59.

Acidification of the basic solution, extraction with dichloromethane, concentration and crystallization from ethanol gave 0.75 g. (0.0020 mole) of the corresponding epimeric acids, M.P. 226–240°.

*Analysis.*—Calcd. for $C_{20}H_{24}N_2O_3$: C, 70.57; H, 7.11; N, 8.23. Found: C, 70.56; H, 7.12; N, 8.16.

The ratio of acids to esters was variable, increasing with reaction time. Quantitative conversion of the acids to the methyl esters was readily achieved by treatment of a dichloromethane solution of the acids with an excess of ethereal diazomethane, followed by concentration and crystallization from ethylacetate.

Conversely, the esters could be saponified by refluxing for 18 hours with an excess of sodium carbonate in aqueous ethanol.

Alternatively, combination of tryptamine and the above aldehyde in acetic acid at 25° for 3 days produced the corresponding Schiff's base diester which could be cyclized to the above lactam esters by heating at 180°.

C. 1,2,3,4,6,7,12 e-octahydro-1-ethyl-1-carbomethoxy-indolo(2,3-a)-quinolizine

A mixture of 1.5 g. (0.00442 mole) of the above lactam ester, 0.93 g. (0.0042 mole) of phosphorous pentasulfide and 15 ml. of 1,2-dimethoxyethane was stirred at 25° for 6 hours, 2 ml. of dry pyridine added, stirring continued for 10 minutes and the mixture then concentrated under vacuum. The residue was treated with 50 ml. of water and 5 ml. of saturated sodium carbonate solution and extracted six times with 50 ml. portions of dichloromethane. The combined extracts were concentrated under vacuum and the residue crystallized by addition of a mixture of a mixture of ether and petroleum ether (B.P. 30–60°). Recrystallization from ethyl acetate and petroleum ether (B.P. 30–60°) gave 0.90 g. (0.0024 mole) of the epimeric thioamides, M.P. 130–137°. The mixture of epimers could be separated by chromatography on 50 g. of neutral, activity II alumina with benzene as eluant. The more rapidly eluted epimer had a M.P. 163–164° and the less rapidly eluted epimer a M.P. 144–145°, both recrystallized from ethyl acetate.

*Analysis.*—Calcd. for $C_{21}H_{26}N_2O_2S$ (VI$a$): C, 68.07; H, 7.07; N, 7.56; S, 8.66. Found: C, 67.84; H, 6.95; N, 7.38; S, 8.94.

*Analysis.*—Calcd. for $C_{21}H_{26}N_2O_2S$ (VI$b$): C, 68.07; H, 7.07; N, 7.56; S, 8.66. Found: C, 68.05; H, 7.09; N, 7.42; S, 8.77.

Refluxing 0.90 g. (0.0024 mole) of a mixture of epimeric thioamides with 7.0 g. of Raney nickel in 100 ml. of dry dioxane for 48 hours, filtration, washing of the residual Raney nickel with 100 ml. of dichloromethane, concentration and crystallization from ligroin (B.P. 60–90°) gave 0.65 g. (0.0019 mole) of a mixture of epimeric amino esters which could be separated by chromatography over 40 g. of neutral alumina with petroleum ether (B.P. 30–60°) and benzene as eluants. The more rapidly eluted epimer showed a M.P. 149–150°, pKa 6.9, infrared max. 1735 cm.$^{-1}$ (ester) and the less rapidly eluted epimer a M.P. 144–145°, pKa 6.5, infrared max. 1725 cm.$^{-1}$ (ester). Both recrystallized from ligroin (B.P. 60–90°).

*Analysis.*—Calcd. for $C_{21}H_{28}N_2O_2$ (VII$a$): C, 74.09; H, 8.29. Found: C, 74.13; H, 8.32.

*Analysis.*—Calcd. for $C_{21}H_{28}N_2O_2$ (VII$b$): C, 74.09; H, 8.29. Found: C, 74.20; H, 8.40.

Alternatively, the individual epimeric amines could be obtained by identical Raney nickel treatment of the individual epimeric thiolactams.

D. Interconversion of epimeric amino esters

A solution of 13.0 mg. (0.0038 m. mole) of either amino ester epimer and 24 mg. (0.0075 m. mole) of mercuric acetate in 6 ml. of acetic acid was heated at 59° for 4 hours. After 1 hour most of the indole ultraviolet absorption at 265, 280 and 290 m$\mu$ had disappeared and the characteristic absorption of the didehydro compound at 250 and 358 m$\mu$ had been generated. The rate of oxidation of the chromatographically more slowly eluted epimer was found to be about twice that of the first eluted epimer. Concentration under vacuum, addition of 10 ml. of absolute ethanol and 0.50 g. of sodium borohydride, stirring for 15 hours at room temperature, acidification, addition of 50 ml. of water and excess sodium hydroxide, extraction with ether and concentration gave a mixture of the original epimeric amino esters in about equal amounts.

E. dl-vincamine, epivincamine, isovincamine and epiisovincamine

A solution of 33 mg. (0.10 m. mole) of the more rapidly eluted amino ester in 10 ml. of anhydrous ether was treated with an excess of sodium triphenylmethane in ether. After 25 minutes 15 mg. (0.10 m. mole) of p-nitroso-N,N-dimethyl-aniline in 10 ml. of dry dioxane was added and the reaction mixture stirred at 25° for 6 hours. Then 5 ml. of water was added and after 15 minutes the reaction mixture poured into 50 ml. of water and extracted five times with 30 ml. portions of ether. Concentration under vacuum, acidification with excess 3% hydrochloric acid, addition of excess aqueous sodium hydroxide after 10 minutes and extraction with dichloromethane and concentration of the extracts gave a mixture which was separated by thin layer chromatography on alumina with 0.5% methanol in dichloromethane. The fastest moving fraction yielded 1.2 mg. of dl-vincamine. Another isolated product showing analogous but somewhat different spectral and chromatographic characteristics yielded epivincamine. Similarly, oxidation of the other epimeric amino ester produced isovincamine and epiisovincamine in analogous amounts, and readily differentiated from vincamine and epivincamine by thin layer chromatography using the system described above.

Identification of the dl-vincamine was accomplished by comparison thereof with a sample of pure natural vincamine whereby such samples yielded identical t.l.c. retention times in multiple adsorption and solvent systems and identical infrared solution spectra.

The invention thus enables the preparation of pharmacologically active vincamine, its stereoisomers and intermediates useful in the preparation thereof.

The preceding example is not to be construed as limiting the invention. It is evident to those skilled in the art that temperatures, solvents, reaction conditions and equivalent techniques may be used without departing from the spirit of the invention or the scope of the appended claims.

I claim:
1. A method for the synthesis of vincamine comprising the steps of
 (a) condensation of tryptamine with 4-ethyl-4-formyl-dimethyl pimelate yielding a lactam ester product;
 (b) reaction of said lactam ester product with phosphorus pentasulfide yielding a thiolactam ester product;
 (c) desulfurization of said thiolactam ester product yielding two epimeric aminoesters;
 (d) chromatographic separation of said aminoesters;
 (e) oxidation of the more rapidly eluted aminoester and subsequent acid treatment to yield vincamine; and
 (f) isolation of vincamine from the product by chromatographic separation.

References Cited

Pailer et al., Monatash fur Chemie, vol. 85, pp. 1055–1059 (1949).

Mokry et al., Tetrahedron Letters #15, pp. 999–1000, (1963).

HENRY R. JILES, *Primary Examiner.*

R. T. BOND, *Assistant Examiner.*

U.S. Cl. X.R.

260—293.2, 293.4, 294, 294.7, 295, 326.3, 999